(12) United States Patent
Karlsson et al.

(10) Patent No.: US 11,446,974 B2
(45) Date of Patent: Sep. 20, 2022

(54) ADJUSTABLE ANTI-ROLL BAR ARRANGEMENT

(71) Applicant: Volvo Truck Corporation, Gothenburg (SE)

(72) Inventors: Pontus Karlsson, Gothenburg (SE); Max Gålnander, Gothenburg (SE); Anders Olsson, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 17/343,244

(22) Filed: Jun. 9, 2021

(65) Prior Publication Data

US 2021/0387501 A1    Dec. 16, 2021

(30) Foreign Application Priority Data

Jun. 10, 2020   (EP) ..................................... 20179191

(51) Int. Cl.
  *B60G 21/055*       (2006.01)
  *B60G 17/015*       (2006.01)

(52) U.S. Cl.
  CPC ..... *B60G 21/0555* (2013.01); *B60G 17/0157* (2013.01); *B60G 2202/135* (2013.01); *B60G 2202/42* (2013.01)

(58) Field of Classification Search
  CPC ............ B60G 21/0555; B60G 21/0553; B60G 21/0558; B60G 21/045; B60G 17/0157;
(Continued)

(56) References Cited

U.S. PATENT DOCUMENTS

| 8,579,313 B2 | 11/2013 | Lee et al. |
| 8,608,186 B2 | 12/2013 | Lee et al. |

(Continued)

FOREIGN PATENT DOCUMENTS

| CN | 109435620 A | 3/2019 | |
| CN | 109484125 A * | 3/2019 | ........... B60G 21/055 |

(Continued)

OTHER PUBLICATIONS

Extended European Search Report for European Patent Application No. 20179191.0, dated Dec. 9, 2020, 12 pages.
(Continued)

*Primary Examiner* — James A English
*Assistant Examiner* — Scott F. Underwood
(74) *Attorney, Agent, or Firm* — Withrow & Terranova, PLLC (57) ABSTRACT

An adjustable anti-roll bar arrangement for a vehicle, comprising a bracket configured to be mounted in a fixed relationship to a chassis or a an axle of the vehicle, a linear actuator connected to the bracket, a guided element, the linear actuator being configured to drive the guided element along a first geometrical axis, a supporting shaft mounted to the bracket and defining a second geometrical axis which has a different extension compared to the first geometrical axis, an anti-roll bar, and a stabilizer stay having a first end connected to the anti-roll bar, and a second end movably connected to and supported by the supporting shaft, the second end being also connected to the guided element such that when the linear actuator drives the guided element along the first geometrical axis, the second end follows the motion along the second geometrical axis. The invention also relates to a vehicle comprising such an arrangement.

15 Claims, 9 Drawing Sheets

(58) Field of Classification Search
CPC ............ B60G 17/025; B60G 2202/135; B60G 2202/42; B60G 2202/422; B60G 2202/1524; B60G 11/20; B60G 2300/02; B60G 2204/1224; B60G 2204/81; B60G 2204/8302

See application file for complete search history.

(56) References Cited

U.S. PATENT DOCUMENTS

| | | | |
|---|---|---|---|
| 8,746,705 B1 | 6/2014 | Kim | |
| 10,336,153 B2* | 7/2019 | Seong | B60G 17/023 |
| 2010/0013175 A1* | 1/2010 | Maeda | B60G 21/0558 |
| | | | 280/5.511 |
| 2010/0032913 A1* | 2/2010 | Kim | B60G 21/0558 |
| | | | 280/5.509 |
| 2012/0049480 A1 | 3/2012 | Lee et al. | |
| 2013/0147136 A1* | 6/2013 | Lee | B60G 21/005 |
| | | | 280/5.508 |
| 2013/0147140 A1 | 6/2013 | Lee et al. | |
| 2013/0147141 A1 | 6/2013 | Lee et al. | |
| 2013/0147142 A1 | 6/2013 | Lee et al. | |
| 2013/0147143 A1 | 6/2013 | Lee et al. | |
| 2014/0183829 A1* | 7/2014 | Kim | B60G 7/001 |
| | | | 280/5.511 |
| 2015/0108732 A1* | 4/2015 | Luttinen | B60G 3/265 |
| | | | 280/93.512 |
| 2018/0043744 A1 | 2/2018 | Villegas Muriel et al. | |
| 2019/0100071 A1 | 4/2019 | Tsiaras et al. | |

FOREIGN PATENT DOCUMENTS

| | | | |
|---|---|---|---|
| DE | 10237439 A1 | 3/2003 | |
| EP | 1810853 A1 * | 7/2007 | ......... B60G 17/0152 |
| EP | 3127726 B1 | 11/2019 | |
| EP | 3594030 A1 | 1/2020 | |
| KR | 20130012295 A | 2/2013 | |
| KR | 1020130012295 A | 2/2013 | |
| WO | 2008054265 A1 | 5/2008 | |

OTHER PUBLICATIONS

European Search Report for EP 20179191.0 dated Sep. 12, 2020, 12 pages.

* cited by examiner

ADJUSTABLE ANTI-ROLL BAR ARRANGEMENT

The present application claims priority to European Patent Application No. 20179191.0, filed on Jun. 10, 2020, and entitled "AN ADJUSTABLE ANTI-ROLL BAR ARRANGEMENT," which is incorporated herein by reference in its entirety.

TECHNICAL FIELD

The invention relates to an adjustable anti-roll bar arrangement for a vehicle. The invention also relates to a vehicle comprising such an anti-roll bar arrangement.

The invention can be applied in heavy-duty vehicles, such as trucks, buses, and construction equipment. Although the invention will be described with respect to a heavy-duty vehicle such as a truck, the invention is not restricted to this particular vehicle but may also be used in other vehicles such as passenger cars.

BACKGROUND

An anti-roll bar may form part of the suspension system of a vehicle. Its purpose is to reduce the roll of the vehicle, for example during fast cornering or when the vehicle runs on a rough road with irregularities in the road surface.

For a truck, the roll stiffness in today's anti-roll bars is normally selected upon order and it stays the same for the entire life cycle of the truck. However, under certain conditions it may sometimes be desirable to have higher roll stiffness than the pre-selected one, while in other cases it may be desirable to have lower roll stiffness than the pre-selected one. For instance, a driver may wish to lower the truck to reduce drag, and in such case it would be desirable to increase the roll stiffness. On the other hand, when a truck is driving on a bumpy road, it would be desirable to decrease the roll stiffness.

U.S. Pat. No. 8,608,186 B2 discloses an active roll control system that may be adapted to actively control roll stiffness of a vehicle by adjusting a mounting position of a stabilizer link connecting a stabilizer arm with a stabilizer bar of the vehicle on the suspension arm.

However, while this system may work on a small passenger car, it is inadequate for the high loads of a truck.

SUMMARY

An object of the invention is to provide an adjustable anti-roll bar arrangement which at least partly alleviates the drawbacks of the prior art. In particular, it should be suitable for implementation on a heavy duty vehicle, such as a truck. The object is achieved by an adjustable anti-roll bar arrangement according to claim 1.

The present invention is not only based on the possibility to change the position of a stabilizer stay to change the roll stiffness, but is in particular based on the realization that by separating a linear displacement of the stabilizer stay from a linear drive axis, the arrangement may take higher loads than if the displacement of the stabilizer stay and the linear drive axis is the same. Thus, the inventors have realized that carrying loads of the anti-roll bar and the stabilizer stay may be achieved by one component (such as a supporting shaft), while the energy supply (such as a linear actuator) for achieving the movement of the stabilizer stay may be provided on another component. Put differently, the adjustable anti-roll bar arrangement may have a translation mechanism which is arranged separately from a supporting structure of the arrangement.

According to a first aspect of the invention, there is provided an adjustable anti-roll bar arrangement for a vehicle, comprising
 a bracket configured to be mounted in a fixed relationship to a chassis or a an axle of the vehicle,
 a linear actuator connected to the bracket,
 a guided element, wherein the linear actuator is configured to drive the guided element along a first geometrical axis,
 a supporting shaft mounted to the bracket and defining a second geometrical axis, the second geometrical axis having a different extension compared to the first geometrical axis,
 an anti-roll bar, and
 a stabilizer stay having a first end connected to the anti-roll bar, and a second end movably connected to and supported by the supporting shaft,
 wherein the second end of the stabilizer stay is also connected to the guided element such that when the linear actuator drives the guided element along the first geometrical axis, the second end of the stabilizer stay follows the motion along said second geometrical axis.

By having the linear actuator drive the guided element along a first geometrical axis and having the load-carrying supporting shaft on a second geometrical axis which is different from the first geometrical axis, the risk of braking the arrangement is greatly reduced.

By changing the position of the second end of the stabilizer stay, the lever action provided by the arrangement is changed, and thereby the roll stiffness of the vehicle can be changed. Moving the second end of the stabilizer stay in an inboard direction, i.e. closer towards the centre of the vehicle, results in lowered roll stiffness. Conversely, moving the second end of the stabilizer stay in an outboard direction, i.e. laterally away from the centre of the vehicle, results in an increased roll stiffness.

The linear actuator may either be directly connected to the bracket or indirectly connected to the bracket. For instance, in the second case, the linear actuator may be connected to another bracket unit or to a cover or the like, which in turn is mounted to the bracket. In other exemplary embodiments, the linear drive may be mounted on a cradle, which in turn may be pivotally attached to the bracket.

The linear actuator may be any suitably type of actuator which conveys a linear motion. It may for instance include electrically, hydraulically, pneumatically, or otherwise generated driving power to the guided element. The guided element may be guided along a physical linear axle or shaft or the like, or may be guided along just a geometrical axis. For instance, the guided element may be provided at the end of a hydraulic or pneumatic piston rod, or may form part of such a piston rod.

The supporting shaft may be any suitable shaft for carry the displaceable stabilizer stay and the anti-roll bar. If the stabilizer stay and the supporting shaft is for example configured to be arranged on the left side of the vehicle, then it should be understood that the anti-roll bar may, of course, have another stabilizer stay at its other end to be carried by another support structure at the right side of the vehicle. In some exemplary embodiments both the left and the right stabilizer stays may be movably connected in accordance with the herein described mechanisms of the invention, while in other exemplary embodiments, only one of the left and right stabilizer stays is movably connected and supported, while the other one is fixedly connected and supported.

The supporting shaft may also be mounted to the bracket directly or indirectly. For instance, in the latter case, the supporting shaft may be mounted to a cradle which may be pivotally attached to the bracket. The supporting shaft may suitable have two ends, each end being fixed to a respective structure. Thus, one end may be fixed to the bracket or to another component (such as a cradle) attached to the bracket, while the other end may be fixed to another bracket unit (such as one that forms a cover, casing or housing).

According to at least one exemplary embodiment, said second geometrical axis is parallel to said first geometrical axis, wherein when the linear actuator drives the guided element along said first geometrical axis, the second end of the stabilizer stay follows the motion in parallel along said second geometrical axis. By having the first and the second geometrical axis in parallel with each other the driving force acting on the guided element may be transmitted to in a simple manner to the second end of the stabilizer stay. Thus, the guided element does not need any complex linkage but may, for instance, be in the form of a rigid body. However, it should be understood, that in other exemplary embodiments the first and the second geometrical axes are not parallel with each other, they may thus be inclined relative to each other. In such, case the linear motion of the guided element along the first geometrical axis may suitable be transferred to the second end of the stabilizer stay via suitable linkage, joints, or the like.

According to at least one exemplary embodiment, the bracket comprises a first side and a second side, wherein the first side faces the second end of the stabilizer stay, wherein the roll stiffness is increased when the second end of the stabilizer stay is moved in a direction towards the bracket, and decreased when the second end of the stabilizer stay is moved in a direction away from the bracket. However, depending on how and where the bracket is mounted relative to the vehicle, such as relative to the chassis of the vehicle, in other exemplary embodiments, the roll stiffness may decrease when the second end of the stabilizer stay is moved towards the bracket, and increase when it is moved away from the bracket.

According to at least one exemplary embodiment the bracket comprises an inboard side and an outboard side, the inboard side being intended to face the centre of the vehicle. In at least some exemplary embodiments (for instance when the bracket is configured to be mounted inboardly of the chassis) the inboard side faces the second end of the stabilizer stay, wherein the roll stiffness is increased when the second end of the stabilizer stay is moved in a direction towards the bracket and decreased when the second end of the stabilizer stay is moved in a direction away from the bracket. In other exemplary embodiments (for instance when the bracket is configured to be mounted outboardly of the chassis), the outboard side faces the second end of the stabilizer stay, wherein the roll stiffness is decreased when the second end of the stabilizer stay is moved towards the bracket and increased when the second end of the stabilizer stay is moved away from the bracket.

As mentioned previously, an anti-roll bar is normally connected via two stabilizer stays, one at each respective end of the anti-roll bar. As also mentioned previously, in some exemplary embodiments both such stabilizer stays may be movable for adjusting the roll stiffness of the vehicle, while in some exemplary embodiments, only one of the stabilizer stays is movable for adjusting the roll stiffness.

Having both stabilizer stays movable is reflected in at least one exemplary embodiment, according to which said anti-roll bar has a left side and a right side, wherein said bracket, said linear actuator, said guided element, said supporting shaft and said stabilizing stay form a set provided on one of the left side and right side of the anti-roll bar, wherein a corresponding set is provided mirror-symmetrically on the other one of the left side and right side of the anti-roll bar.

The direction of movement of the stabilizer stay when changing the roll stiffness may suitably be a direction closer to or further away from the other stabilizer stay. This is reflected in the below exemplified embodiments.

Thus, according to at least one exemplary embodiment, said stabilizer stay is a first stabilizer stay located at one end of the anti-roll bar, wherein the adjustable anti-roll bar arrangement further comprises another stabilizer stay located at the other end of the anti-roll bar, wherein when the second end of the first stabilizer stay moves towards said another stabilizer stay the roll stiffness is decreased, and when the second end of the first stabilizer stay moves in a direction away from said another stabilizer stay the roll stiffness is increased.

The first end of the stabilizer stay is suitably substantially stationary relative to the anti-roll. Since the second end is movable, the movement results in a change of inclination relative to the anti-roll bar. Thus, the movement of the anti-roll bar may also be expressed as an angular change. For instance, according to at least one exemplary embodiment, the stabilizer stay form an angle relative to the anti-roll bar, wherein when said angle is increased then the roll stiffness is increased, and when said angle is decreased then the roll stiffness is decreased.

As mentioned previously, various types of linear actuators may be implemented in the adjustable anti-roll bar arrangement. According to at least one exemplary embodiment, the linear actuator comprises an electric motor and a guide shaft defining the first geometrical axis, wherein the electric motor is configured to drive the guided element along said guide shaft. In some exemplary embodiments, the linear actuator may also comprise a set of gears for converting the rotational motion of the electric motor to a linear motion of a spindle or other component. In some exemplary embodiments, the rotational motion of the motor can be transmitted to rotation of the guide shaft, which may suitably function as a lead screw. This is reflected in the following exemplary embodiment.

According to at least one exemplary embodiment, said guide shaft is a lead screw provided with male threads, wherein the guided element is provided with female threads engaging the male threads, wherein the electric motor is configured to rotate the lead screw, wherein the guided element moves along the lead screw when the lead screw is rotated. Thus, the guide shaft in the form of a lead screw defines the first geometrical axis.

According to at least one exemplary embodiment, the adjustable anti-roll bar arrangement comprises a pivotable element which is pivotally mounted to the bracket via a pivot axle, wherein the supporting shaft is connected to the pivotable element such that when the pivotable element pivots about the pivot axle, the supporting shaft, the linear actuator and the guided element follows the pivoting motion of the pivotable element. Thus, the pivotable element may function as a cradle which compensates for unevenness of the road surface.

According to at least one exemplary embodiment, said supporting shaft is a first supporting shaft, said anti-roll bar is a first anti-roll bar, and
said stabilizer stay is a first stabilizer stay,
wherein the adjustable anti-roll bar arrangement is configured for a double-axle installation (double-axle aggregate) by further comprising:
a second anti-roll bar, and
a second stabilizer stay, and
optionally, a second supporting shaft mounted to the bracket and defining a third geometrical axis,
wherein the second stabilizer stay has a first end connected to the second anti-roll bar, and a second end movably connected to and supported by the first supporting shaft or by said optional second supporting shaft,
wherein the second end of the second stabilizer stay is also connected to the guided element such that when the linear actuator drives the guided element along the first geometrical axis, the second end of the second stabilizer stay follows the motion along said second or third geometrical axis.

Thus, at least some exemplary embodiments may suitably be implemented for a double-axle aggregate, typically at rear wheels. The each wheel axle is paired with a respective one of the anti-roll bars. Each anti-roll bar may have at least one movable stabilizer stay. The movable stabilizer stays on the same side of the anti-roll bar, for example both left side stabilizer stays, extend from their respective anti-roll bar and may suitable be connected to the same supporting shaft, i.e. the first supporting shaft. In other exemplary embodiments, the second end of the respective stabilizer stay may be connected to a respective supporting shaft. In case of a common supporting shaft, first geometrical axis may suitably be located in the same vertical plane as the second geometrical axis, i.e. one above the other. In case of separate supporting shafts, the second and third geometrical axes may suitably be located on either side of the first geometrical axis. This is reflected in the following exemplary embodiment.

According to at least one exemplary embodiment, the first, second and third geometrical axes are located in a first, second and third geometric plane, respectively, wherein said first, second and third geometric planes extend in parallel with each other, and wherein the first geometric plane is located in between the second and third geometric planes. It should be understood that the first, second and third geometrical axes do not necessarily have to be located in the same horizontal plane but can be vertically displaced relative to each other. For instance, the second and third geometrical axes may be located in a common horizontal plane while the first geometrical axis is located in a different horizontal plane. Furthermore, it should be understood that it is not necessary for the first, second and third geometrical axes to be located in horizontal planes, they could be located in inclined planes.

According to at least one exemplary embodiment, the adjustable anti-roll bar arrangement comprises a controller configured to receive an input signal and based on the input signal send a control signal to the linear actuator to activate the linear actuator to move the guided element. This is beneficial as it provides an efficient adjustability of the roll stiffness of the vehicle. The adjustability may either be manual, for instance via a user interface, such as in a vehicle cabin, or the adjustability may be automatic, such as sensor-based.

Thus, according to at least one exemplary embodiment, the input signal is one of:
a driver command signal representative of a driver request for change of roll stiffness of the vehicle, and
a sensor signal received from a sensor configured to detect vehicle operating parameters and/or road surface roughness variations.

Some examples of conceivable sensors for providing the sensor signal are level sensors, steering angle sensor, lateral acceleration sensors, load sensors and speed sensors. Furthermore, the controller may suitably receive more than one sensor signals, and act accordingly. For instance, the steering angle sensor, may provide indications of the bumpiness of the road, and the roll stiffness may suitably be adjusted differently depending on the speed of the vehicle on the bumpy road.

According to a second aspect of the invention, there is provided a vehicle comprising an adjustable anti-roll bar arrangement according to the first aspect of the invention, including any embodiment thereof.

A vehicle is normally defined by a geometrical roll axis, which extends in the longitudinal direction of the vehicle, i.e. the normal driving direction. A vehicle is also defined by a geometrical pitch axis extending in the lateral or transverse direction of the vehicle, i.e. from left to right or vice versa. Furthermore, a vehicle is defined by a yaw axis extending in the vertical direction, i.e. from the ground and up through the vehicle. Together, the roll axis, the pitch axis and the yaw axis for orthogonal coordinate axes.

According to at least one exemplary embodiment, said first geometrical axis extends in parallel to the pitch axis. Thus, the linear movement of the guided element is towards the centre of the vehicle or laterally away (such as to the left or right side) of the vehicle.

According to at least one exemplary embodiment, the movement of the second end of the stabilizer stay towards the centre of the vehicle decreases the roll stiffness of the vehicle, and movement of the second end of the stabilizer stay away from the centre of the vehicle increases the roll stiffness of the vehicle. This movement may, for instance, be in parallel with the pitch axis. By changing the lateral or transverse position of the second end of the stabilizer stay, the lever effect around the roll axis of the vehicle is changed, thus affecting the roll stiffness of the vehicle.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
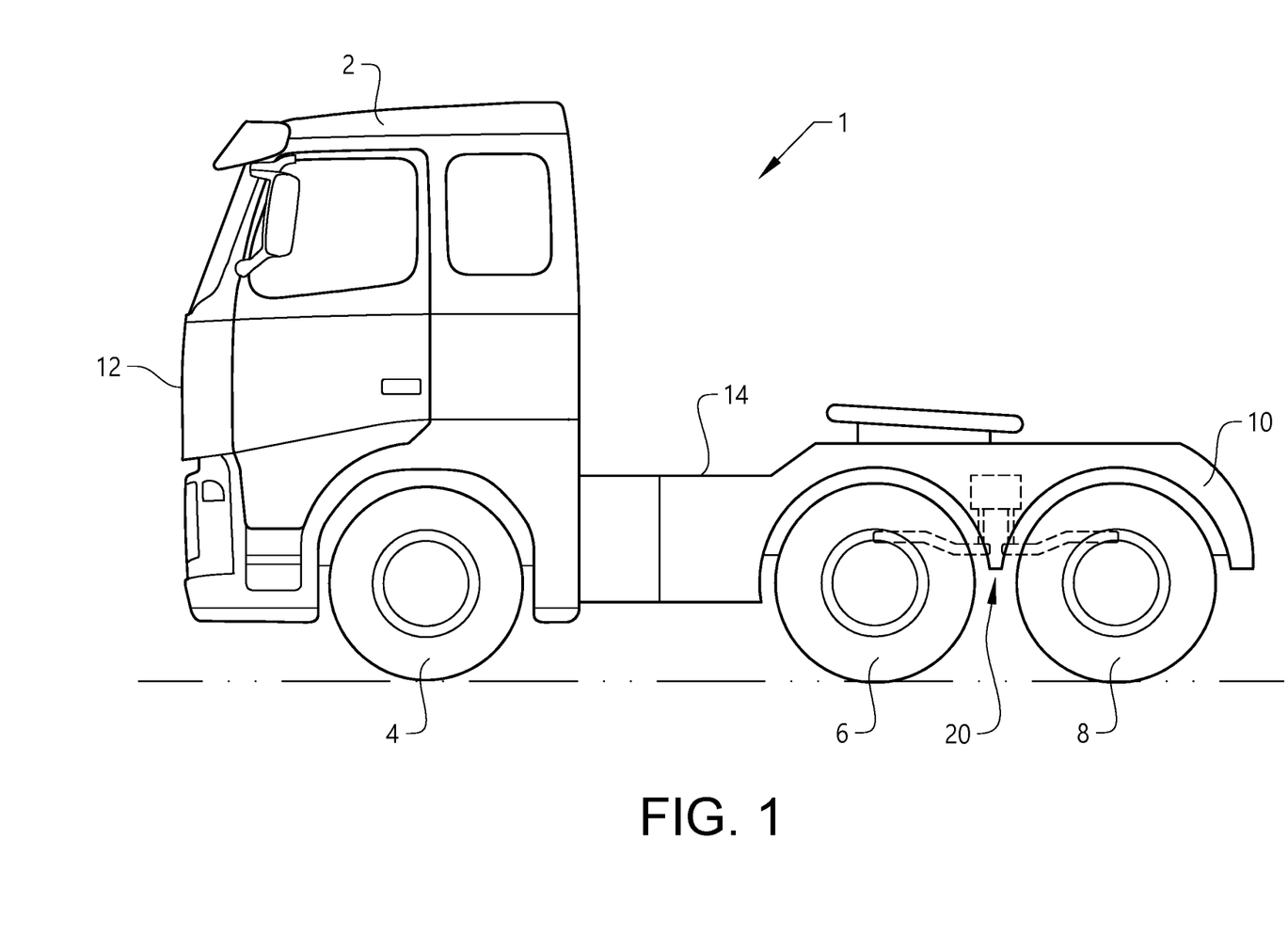
FIG. 1 illustrates a vehicle, in accordance with at least one exemplary embodiment of the invention.

FIG. 1 illustrates a vehicle 1, in accordance with at least one exemplary embodiment of the invention. Although the vehicle 1 is illustrated in the form of a truck, other types of vehicles, such as busses, construction equipment, trailers or passenger cars may be provided in accordance with the invention.

The truck (vehicle) 1 comprises a cab 2 in which a driver may operate the vehicle 1. The vehicle 1 comprises a number of road wheels, herein illustrated as one front pair of wheels 4 and two rear pairs of wheels 6, 8. The rear pairs of wheels 6, 8 may be referred to as a double-axle aggregate. It should, however, be understood that in other embodiments there may be a different number of wheels, such as a single pair of rear wheels.

The vehicle 1 comprises a rear end 10, a front end 12 located forwardly of the rear end 10, wherein a direction extending from the rear end 10 towards the front end 12 or vice versa is defined as a longitudinal direction of the vehicle 1, which is a direction along the roll axis of the vehicle 1. A chassis 14 extends between the rear end 10 and the front end 12. An adjustable anti-roll bar arrangement 20 is located at the rear wheels 6, 8, as will be described in more detail in connection with the following figures.

Figure 2:
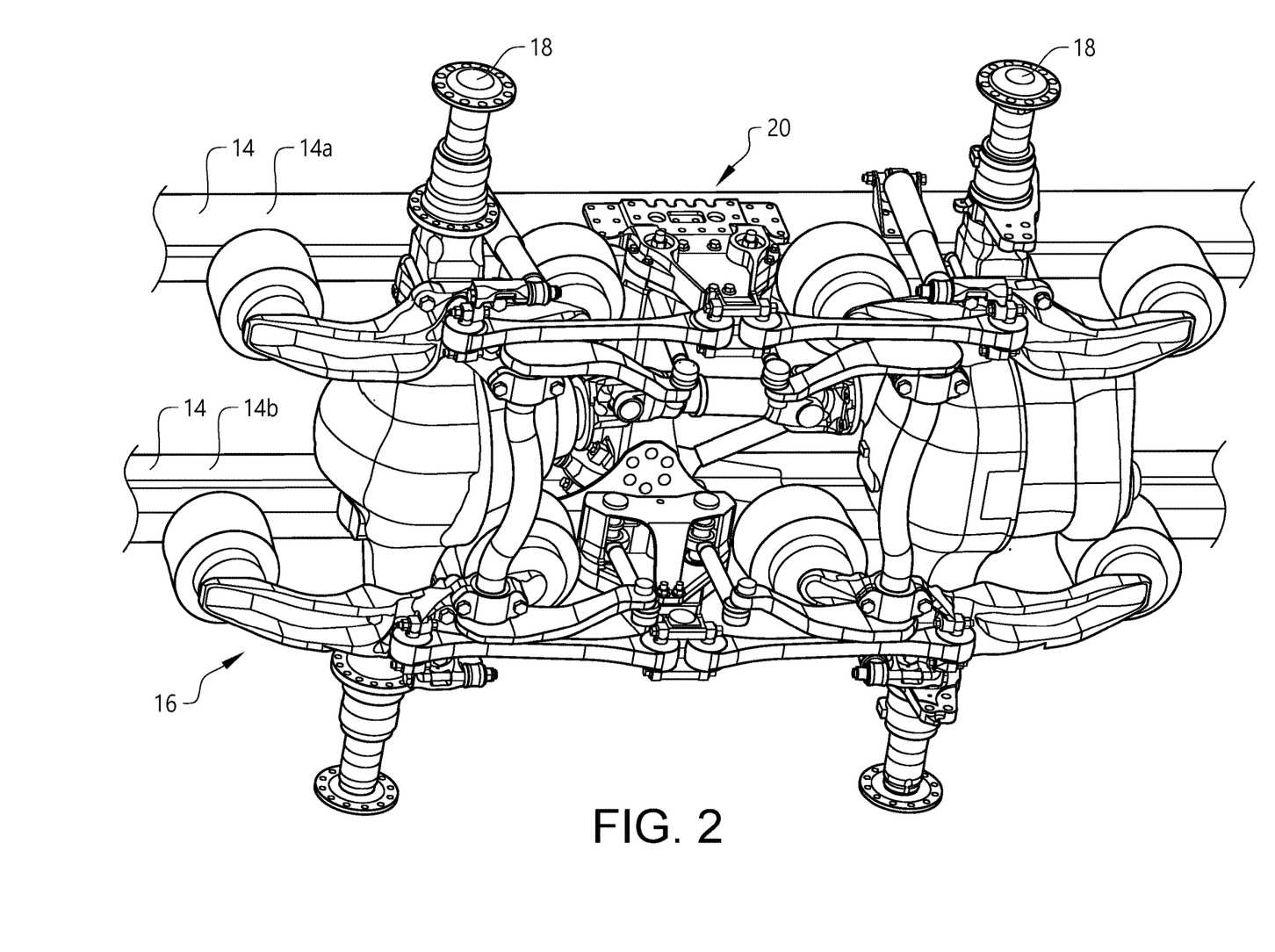
FIG. 2 illustrates from below, and in a perspective view, a vehicle chassis and a double-axle wheel suspension, wherein an adjustable anti-roll bar arrangement according to at least one exemplary embodiment is provided.

FIG. 2 illustrates from below, and in a perspective view, a vehicle chassis 14 and a double-axle wheel suspension system 16, wherein an adjustable anti-roll bar arrangement 20 according to at least one exemplary embodiment is provided. It should be understood that although all the drawings illustrate a double-axle arrangement, the inventive principle can be implemented just as well in a single axle arrangement.

FIG. 2 illustrates two frame members 14a, 14b of the chassis 14. Two wheel axles 18 extend transversely across the frame members 14a, 14b. The wheel axles 18 are suspended by an appropriate suspension system 16. The adjustable anti-roll bar arrangement 20 may form part of or be connected to the suspension system 16.

Figure 3:
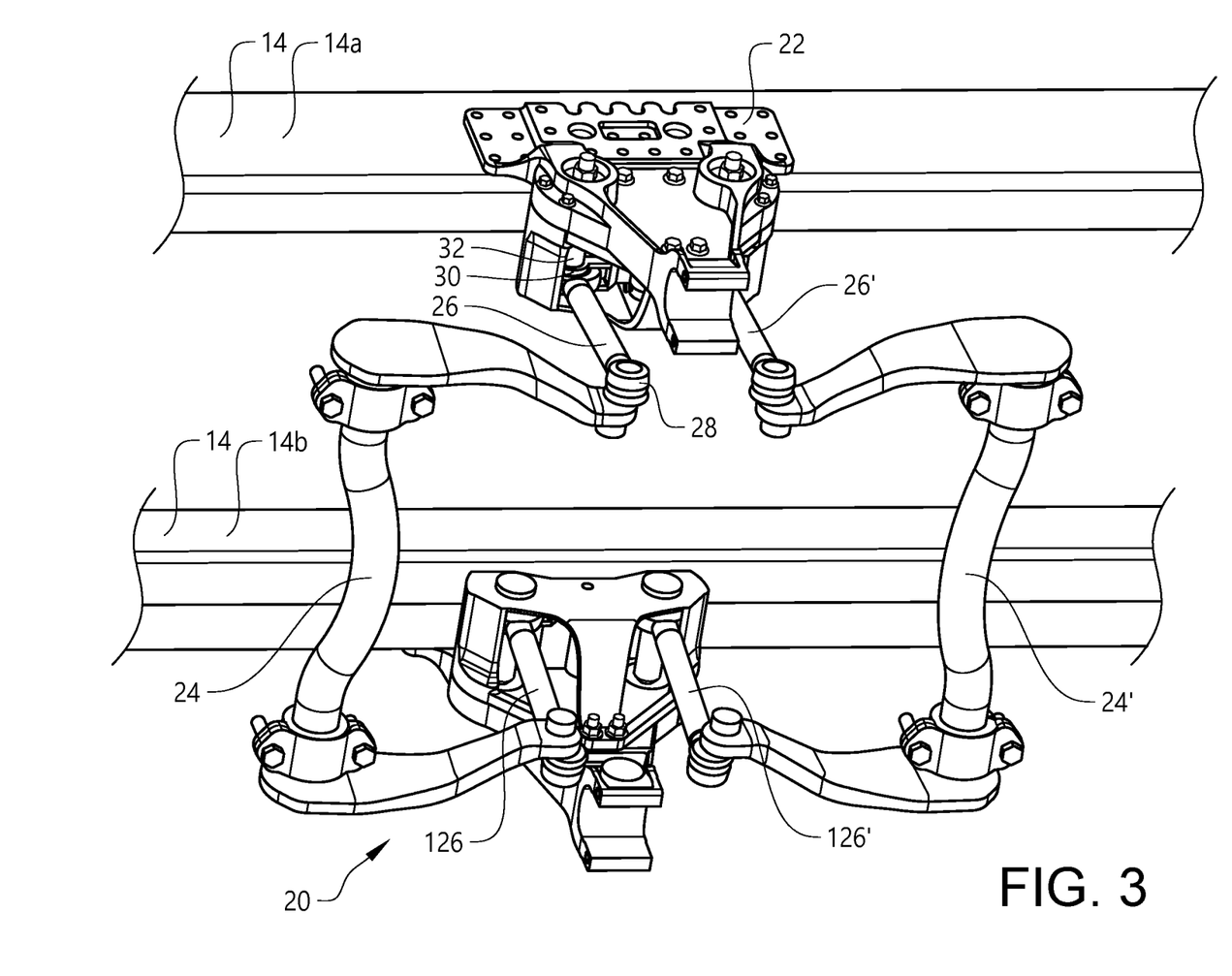
FIG. 3 illustrates from below, and in a perspective view, similarly to FIG. 2, a vehicle chassis to which the adjustable anti-roll bar arrangement has been mounted (the rest of the double-axle wheel suspension has been omitted in this illustration).

FIG. 3 illustrates from below, and in a perspective view, similarly to FIG. 2, a vehicle chassis 14 to which the adjustable anti-roll bar arrangement 20 has been mounted (the rest of the double-axle wheel suspension and the wheel axles have been omitted in this illustration for the sake of clarity).

The adjustable anti-roll bar arrangement 20 comprises a bracket 22 which here is illustrated as fastened to the chassis 14, in particular to one of the frame members 14a of the chassis 14. Thus, the bracket 20 is mounted in fixed relationship to the chassis 14. It should, however, be understood that in other exemplary embodiments the bracket 22 may instead be mounted in fixed relationship to a wheel axle.

In this illustrated example, the bracket 22 is mounted in fixed relationship to one of the frame members 14a of the chassis 14. The bracket 22 is herein illustrated as being mounted on the outboard side of the frame member 14a (i.e. the side of the frame member 14a facing laterally away from the roll axis and the centre of the vehicle). However, in other exemplary embodiments it would be conceivable to mount it on the inboard side of the frame member 14a (i.e. the side of the frame member 14a facing the roll axis and the centre of the vehicle).

The adjustable anti-roll bar arrangement 20 also comprises an anti-roll bar 24, herein illustrated as a first anti-roll bar for one of the rear wheel axles. This exemplary embodiment also has a second anti-roll bar 24' for the other one of the rear wheel axles. As explained previously, in a single axle implementation, one anti-roll bar would suffice. In the following only the first anti-roll bar 24 will be discussed. However, it should be understood that the corresponding features are suitably present on the second anti-roll bar 24' as well. The anti-roll bar 24 has a stabilizer stay 26 having a first end 28 connected to the anti-roll bar 24. The anti-roll bar 24 is herein illustrated as forming a general U-shape, wherein at the first end 28 of the stabilizer stay 26 is attached to one end of the U-shape, i.e. one end of the anti-roll bar 24. At the other end of the U-shape, i.e. at the other end of each anti-roll bar 24, there is provided another stabilizer stay 126. It should be understood that for each anti-roll bar 24, 24', regardless of if provided in a double-axle implementation as in the exemplified illustration or in a single axle implementation, the inventive principle may be achieved by having only one of the stabilizer stays 26 for each anti-roll bar 24, 24' adjustable between different positional settings, while the other stabilizer stay 126 has a fixed setting. In the present figures, however, all stabilizer stays 26, 126 are illustrated as being adjustable to different positional settings, as will be discussed later with respect to other figures.

As can be seen in FIG. 3 each stabilizer stay 26, 126 has an extension from its first end 28 to a second end 30. The second end 30 of the stabilizer stay 26 is connected to and supported by a supporting shaft 32, which is mounted to the bracket 22. The position of the second end 30 of the stabilizer stay 26 is adjustable along the supporting shaft 32, whereby the roll stiffness of the vehicle may be adjusted.

Figure 4A:
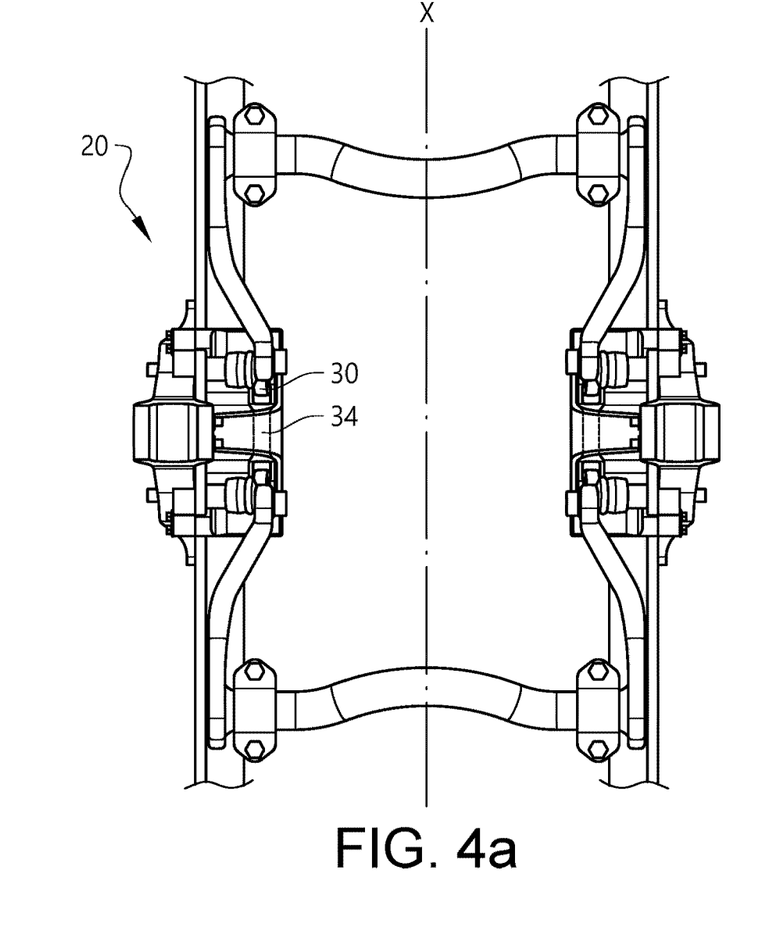
FIGS. 4a and 4b illustrate from below two different settings of the adjustable anti-roll bar arrangement mounted to a vehicle chassis.
Figure 4B:
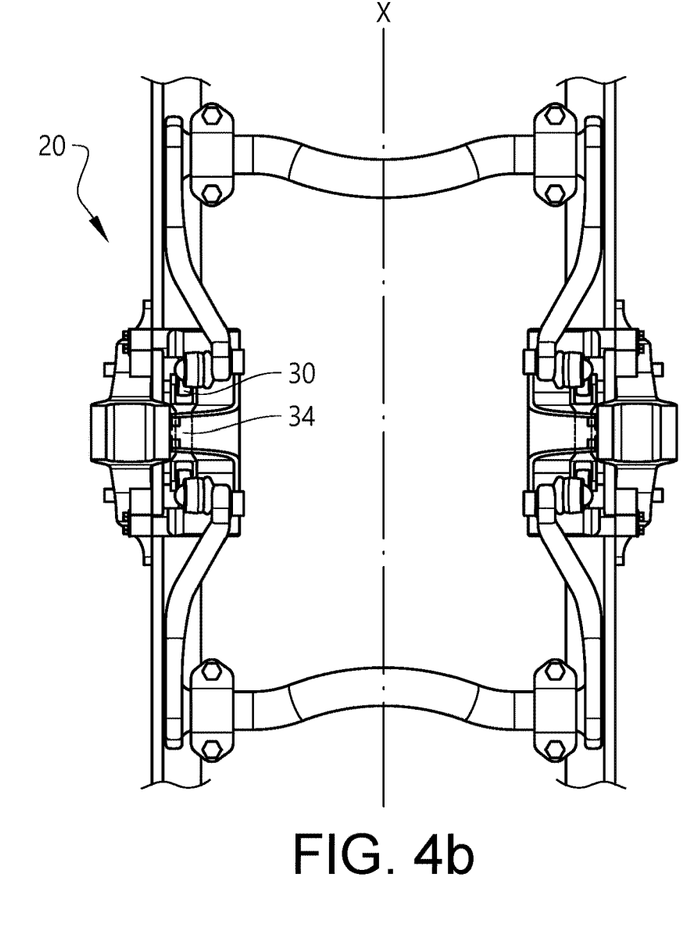

FIGS. 4a and 4b illustrate from below two different settings of the adjustable anti-roll bar arrangement 20 mounted to a vehicle chassis. FIG. 4a illustrates a setting in which the second end 30 of each stabilizer stay is located relatively far from the bracket, but closer to the roll axis X in the centre of the vehicle. This provides a relatively low roll stiffness. FIG. 4b illustrates a setting in which the second end 30 of each stabilizer stay is located closer to the bracket, i.e. more distanced from the roll axis X. This provides a relatively high roll stiffness. The adjustability is achieved by having the second end 30 of each stabilizer stay connected to a guided element 34 which is driven by a linear actuator. The positional change of the guided element 34 is clearly visible in FIGS. 4a and 4b. These components and their interaction will now be explained in more detail in connection with FIGS. 5, 6, 7a and 7b.

Figure 5:
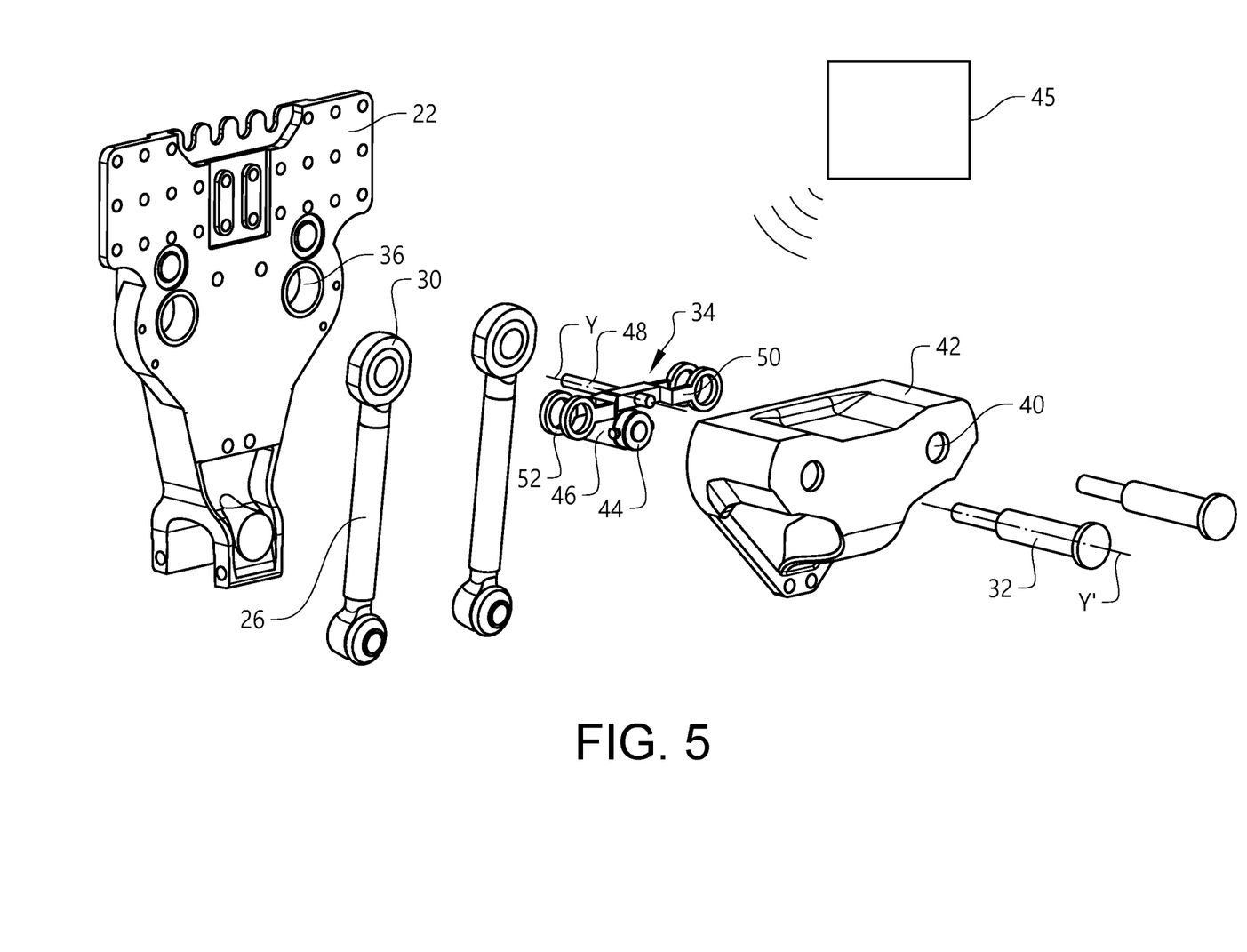
FIG. 5 illustrates an exploded view of some of the parts of the adjustable anti-roll bar arrangement.
Figure 6:
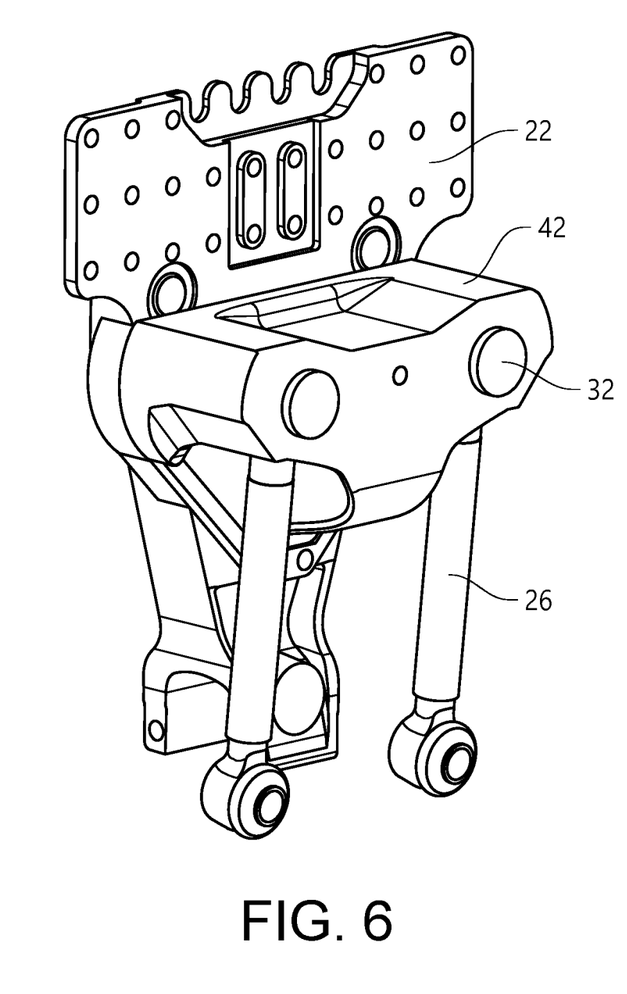
FIG. 6 illustrates the parts in FIG. 5 in an assembled state.
Figure 7A:
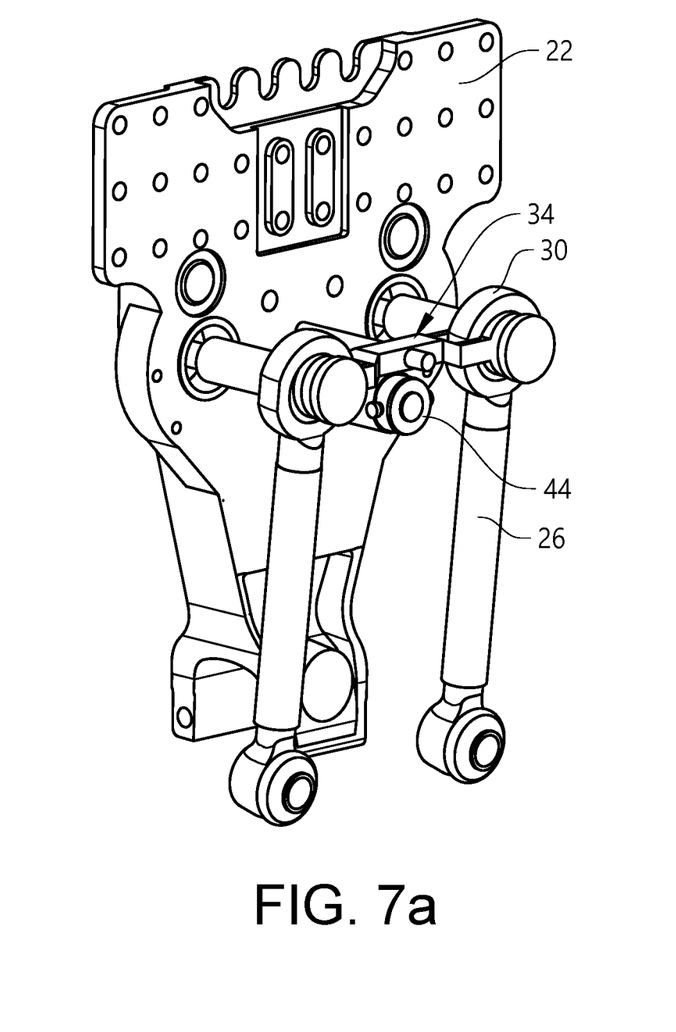
FIGS. 7a and 7b illustrates two settings for some of the parts in FIG. 5.
Figure 7B:
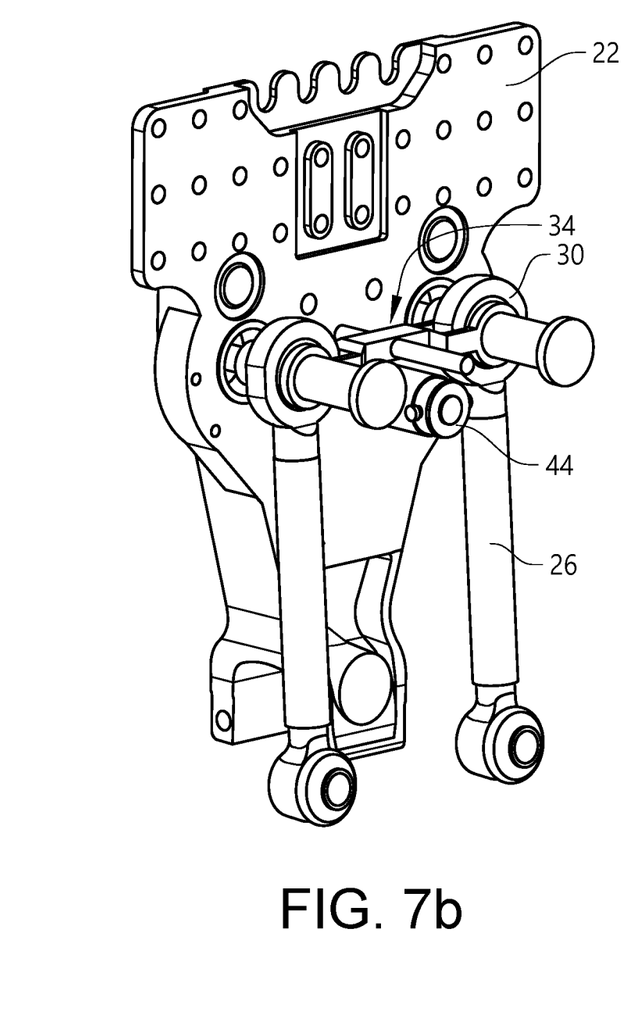

FIG. 5 illustrates an exploded view of some of the parts of the adjustable anti-roll bar arrangement. FIG. 6 illustrates the parts in FIG. 5 in an assembled state. FIGS. 7a and 7b illustrates two settings for some of the parts in FIG. 5.

Starting with FIG. 5, the bracket 22 for mounting in a fixed relationship to the chassis is illustrated. Suitably, the bracket 22 may be fastened to the chassis by appropriate fasteners, such as bolts, rivets, etc. The bracket 22 is provided with two openings 36 for receiving two supporting shafts 32. In case of a single axle installation, a single opening 36 and a single supporting shaft 32 would suffice. In this exemplary embodiments, the supporting shafts 32 are inserted through a pair of holes 40 of another bracket unit, formed as a cover 42 (or casing/housing) and extend all the way to, and suitably through the bracket 22, where they may be fixated, such as by a threaded nut (not illustrated). It should, however, be understood that other ways of mounting the supporting shafts 32 are conceivable, as long as they enable the supporting shafts 32 to have the supporting function and allow for movement of the stabilizer stays 26.

The movement of the stabilizer stays 26 is achieved by means of the guided element 34, which in turn is moved by means of a linear actuator 44, in this example illustrated as comprising an electric motor 46 and a guide shaft 48 in the form of a lead screw. The linear actuator 44 is fixed to the cover 42, which in turn is fastened to the bracket 22, such as by screws, rivets, etc. Thus, in this exemplary embodiment, the linear actuator 44 is connected to the bracket 22 via the cover 42, however, in other exemplary embodiments, the linear actuator 44 may be directly connected to the bracket 22.

As mentioned previously, the adjustable anti-roll bar arrangement also comprises the guided element 34, which the linear actuator 44 is configured to drive. More particularly, the linear actuator 44 is configured to drive the guided element 34 along a first geometrical axis Y, which in this exemplary embodiment is defined by the longitudinal extension of the guide shaft 48. However, in other exemplary embodiments, for instance in case the linear actuator comprises a hydraulic cylinder, the first geometrical axis Y may be defined by a piston or piston rod. The first geometrical axis Y may coincide with the pitch axis of the vehicle or extend in parallel to the pitch axis. However, in other exemplary embodiments, the first geometrical axis Y may be angled relative to the pitch axis.

In the illustrated exemplary embodiment, the guided element 34 may be provided with female threads which engage male threads of the guide shaft 48, having the function of a lead screw. The electric motor 46 is configured to rotate the lead screw, wherein the guided element 34 moves along the lead screw when the lead screw is rotated.

FIG. 5 symbolically illustrates that the adjustable anti-roll bar arrangement may comprise a controller 45 configured to receive an input signal and based on the input signal send a control signal to the linear actuator 44 to activate the linear actuator 44 to move the guided element 34. The controller 45 may send and receive the signals wirelessly (as illustrated in the drawings) and/or by wire. The controller 45 may include a microprocessor, microcontroller, programmable digital signal processor or another programmable device. The controller 45 may also, or instead, include an application specific integrated circuit, a programmable gate array or programmable array logic, a programmable logic device, or a digital signal processor. Where the controller 45 includes a programmable device such as the microprocessor, microcontroller or programmable digital signal processor mentioned above, the processor may further include computer executable code that controls operation of the programmable device.

The input signal to the controller 45 may suitably a driver command signal representative of a driver request for change of roll stiffness of the vehicle. The input signal may instead be or additionally comprise a sensor signal received from a sensor configured to detect vehicle operating parameters and/or road surface roughness variations. As mentioned previously, some exemplary sensors may be level sensors, steering angle sensor, lateral acceleration sensors, load sensors, speed sensors, etc.

In the illustrated exemplary embodiment, the guided element 34 comprises two pairs of jaws 50, one pair of jaws for each stabilizer stay. Each pair of jaws 50 comprises two spaced-apart ring-shaped portions 52, herein illustrated as ring-shaped end portions. The second end 30 of each stabilizer stay 26 is intended to be placed between these ring-shaped portions 52, i.e. between the respective pair of jaws 50. The ring-shaped portions 52 as well as the second end portion 30 of the stabilizer stay 26, which is herein illustrated as being annular, are configured to receive the respective supporting shaft 32. Thus, when the adjustable anti-roll bar arrangement has been correctly installed and in operation, each supporting shaft 32 will extend through the cover 42, then through one of the ring-shaped portions 52 of one of the pair of jaws 50, then through the second end 30 of the stabilizer stay 26, then through the other one of the ring-shaped portions 52 of said pair of jaws 50, and then to the opening 36 of the bracket 22. As will be readily understood, the movement of the guided element 34 will be transferred via the pair of jaws 50 surrounding the second end 30 of the stabilizer stay 26, so that the second end 30 of the stabilizer stay 26 can move along the supporting shaft 32.

Thus, the second end 30 of the stabilizer stay 26 is connected both to the supporting shaft 32 (because it encircles the supporting shaft 32) and to the guided element 34 (because it is enclosed on both sides by the pair of jaws 50).

The supporting shaft 32 defines a second geometrical axis Y', which has a different extension compared to the first geometrical axis Y. When the linear actuator 44 drives the guided element 34 along the first geometrical axis Y, the second end 30 of the stabilizer stay 26 follows the motion along the second geometrical axis Y'. This is illustrated in FIGS. 7a and 7b.

In FIG. 7a the linear actuator 44 has driven the guided element 34, which in turn has brought along the stabilizing stays 26 to a position which is closer to the centre of the vehicle and the pitch axis X (cf. FIG. 4a), i.e. they have been moved in an inboard direction. This provides a relatively low roll stiffness of the vehicle. In FIG. 7b, the linear actuator 44 has driven the guided element 34, which in turn has brought along the stabilizing stays 26, to a position which is further away from the centre of the vehicle the pitch axis X (cf. FIG. 4b), i.e. they have been moved in an outboard direction, which is opposite to the inboard direction. This provides a relatively high roll stiffness of the vehicle.

For the embodiments illustrated in FIGS. 7a and 7b, the difference in roll stiffness may also be expressed in the following manner. The bracket 22 may be considered to have a first side and a second side, wherein the first side faces the second end 30 of the stabilizer stay 26, wherein the roll stiffness is increased when the second end 30 of the stabilizer stay 26 is moved in a direction towards the bracket 22 (FIG. 7b), and decreased when the second end 30 of the stabilizer stay 26 is moved in a direction away from the bracket 22 (FIG. 7a). Another way to express it, and in relation to the other stabilizer stay 126 at the other end of the respective anti-roll bar 24 (cf. FIG. 3), is as follows. The first stabilizer stay 26 is located at one end of the anti-roll bar 24, wherein the adjustable anti-roll bar arrangement 20 further comprises another stabilizer stay 126 (as illustrated in FIG. 3) located at the other end of the anti-roll bar 24, wherein when the second end 30 of the first stabilizer stay 26 moves towards said other stabilizer stay 126 the roll stiffness of the vehicle is decreased, and when the second end 30 of the first stabilizer stay 26 moves in a direction away from said other stabilizer stay 126 the roll stiffness of the vehicle is increased. Thus, the anti-roll bar 24 may be regarded as having a left side and a right side, wherein said bracket 22, said linear actuator 44, said guided element 34, said supporting shaft 32 and said stabilizing stay 26 form a set provided on one of the left side and right side of the anti-roll bar 24, wherein a corresponding set is provided mirror-symmetrically on the other one of the left side and right side of the anti-roll bar 24.

Although the figures have illustrated certain ways of connecting the second end 30 of the stabilizer stays 26 to the supporting shafts 32 and to the guided element 34, it should be understood that many other ways of connecting them are conceivable. The fundamental idea of having the driving force separated from the position of the stabilizer stays 26, i.e. to drive the guided element 34 along a first geometrical axis Y and to transfer the motion to the second end 30 of the stabilizer stay 26 for movement along a second geometrical axis Y', can clearly be implemented in numerous different ways.

Furthermore, it should be understood that although the figures illustrate that the second geometrical axis Y' is parallel to the first geometrical axis Y, other directions of those axes may be conceivable. Thus, in the figures, when the linear actuator 44 drives the guided element 34 along said first geometrical axis Y, the second end 30 of the stabilizer stay 26 will follow the motion in parallel along said second geometrical axis Y'. However, depending on available space, etc. it may be conceivable that one of the axes Y, Y' is inclined, wherein the guided element 34 may be suitably linked to the second end 30 of the stabilizing stay 26 for appropriately transferring the movement.

Since the figures illustrate a double-axle installation, two supporting shafts 32 have been illustrated. With reference to previously discussed FIG. 3, a first anti-roll bar has been indicated by reference numeral 24 and a second anti-roll bar has been indicated by reference numeral 24'. The stabilizer stays connected to the first anti roll bar have been indicated by reference numerals 26, 126. Corresponding stabilizer stays connected to the second anti-roll bar 24' have been indicated by reference numerals 26', 126. Thus, taking for example the first stabilizer stay 26 and the second stabilizer stay 26' which are operatively connected to the bracket 22 at frame member 14*a*, they may be connected to a respective first and second supporting shaft, such as the two supporting shafts 32 illustrated in FIG. 5. However, in other exemplary embodiments the stabilizer stays 26, 26' may instead be connected to common supporting shaft. In other words, one of the supporting shafts 32 in FIG. 5 could be omitted. The remaining supporting shaft 32 could remain where it is, or be placed vertically above or below the linear actuator 44, or at another suitable location with respect to the bracket 22.

Since the embodiment illustrated in FIG. 5 includes two supporting shafts 32 one of them may be considered to define the second geometrical axis Y' (for instance the left one in FIG. 5 as indicated) while the other one could be considered to define a third geometrical axis (for instance the right one in FIG. 5). In the present exemplary illustration, the first, second and third geometric axes are located in a first, second and third geometric plane, respectively, wherein said first, second and third geometric planes extend in parallel with each other, and wherein the first geometric plane is located in between the second and third geometric planes. For instance, the first, second and third geometric planes may be vertical planes.

Figure 8A:
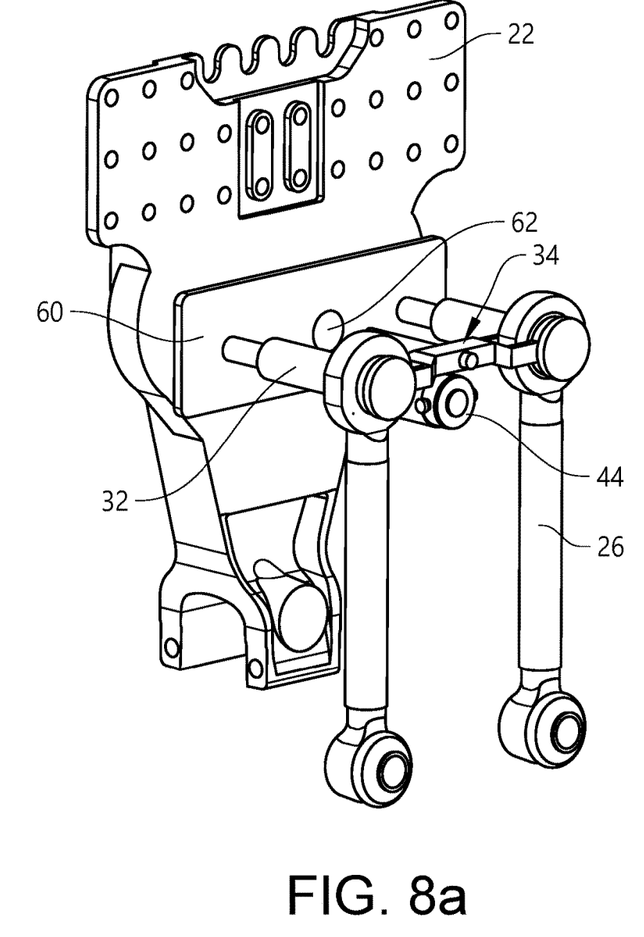
FIG. 8a illustrates parts of at least another exemplary embodiment of an adjustable anti-roll bar arrangement, in an assembled state.
Figure 8B:
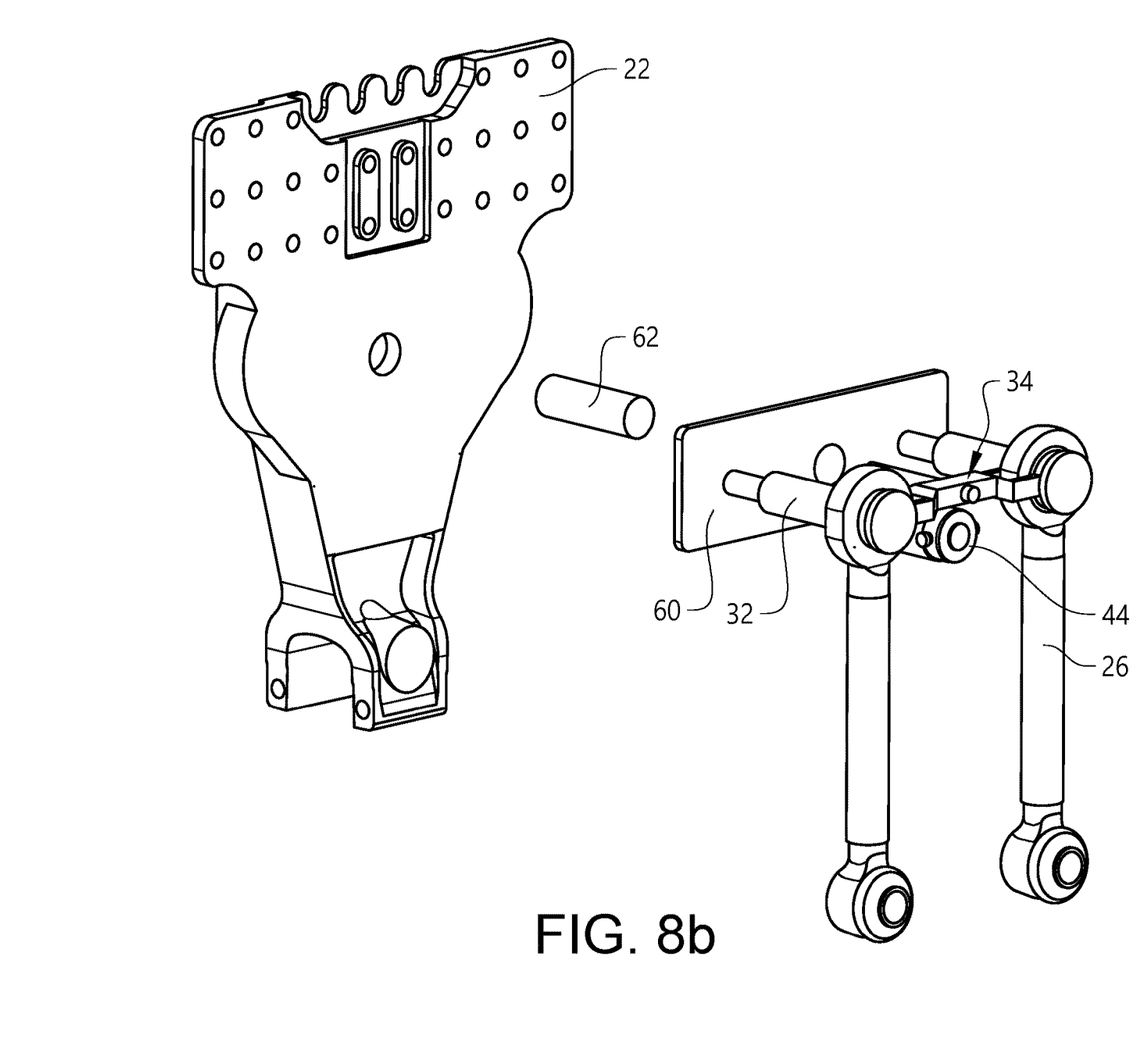
FIG. 8b illustrates the parts in FIG. 8a, in a partly exploded view.

FIG. 8*a* illustrates parts of at least another exemplary embodiment of an adjustable anti-roll bar arrangement, in an assembled state. FIG. 8*b* illustrates the parts in FIG. 8*a*, in a partly exploded view. In this embodiment, there is provided a pivotable element 60 which is pivotally mounted to the bracket 22 via a pivot axle 62. Each supporting shaft 32 is connected to the pivotable element 60 such that when the pivotable element 60 pivots about the pivot axle 62, the supporting shaft 32, the linear actuator 44 and the guided element 34 follows the pivoting motion of the pivotable element 60. Thus, the pivotable element 60 may function as a cradle which compensates for the unevenness of the road surface. For instance, assuming that the left side of the vehicle runs over a bump in the road, then in the illustrated double-axle configuration, one of the left wheels will reach the bump before the next one. The pivotable element 60 provides an extra degree of freedom. In relation to the roll axis of the vehicle, the pivotable element 60 allows the wheel axle of the leading wheel (when going up the bump) to be inclined differently compared to the inclination of the wheel axle of the following wheel (which has not yet reached the bump).

Accordingly, compared to the embodiment illustrated in the previous figures, in the present embodiment of FIGS. 8*a* and 8*b* the pivotable element 60 basically creates a layer between the bracket 22 and the other components. Although not illustrated, this embodiment may also be provided with a cover, and the various components, such as the linear actuator 44 and the supporting shafts 32 may be attached to the cover in the corresponding way as for the previous embodiment shown in FIGS. 5 and 6. In the present embodiment of FIGS. 8*a* and 8*b*, however, the cover would not be fixed to the bracket 22 but instead to the pivotable element 60.

It is to be understood that the present invention is not limited to the embodiments described above and illustrated in the drawings; rather, the skilled person will recognize that many changes and modifications may be made within the scope of the appended claims.

The invention claimed is:

1. An adjustable anti-roll bar arrangement for a vehicle, comprising:
   a bracket configured to be mounted in a fixed relationship to a chassis or an axle of the vehicle,
   a linear actuator connected to the bracket,
   a guided element, the linear actuator configured to drive the guided element along a first geometrical axis,
   a supporting shaft mounted to the bracket and defining a second geometrical axis, the second geometrical axis having a different extension compared to the first geometrical axis,
   an anti-roll bar, and
   a stabilizer stay having a first end connected to the anti-roll bar, and a second end movably connected to and supported by the supporting shaft,
   the second end of the stabilizer stay connected to the guided element such that when the linear actuator drives the guided element along the first geometrical axis, the second end of the stabilizer stay follows the motion along the second geometrical axis.

2. The adjustable anti-roll bar arrangement of claim 1, wherein the second geometrical axis is parallel to the first geometrical axis, wherein when the linear actuator drives the guided element along the first geometrical axis, the second end of the stabilizer stay follows the motion in parallel along the second geometrical axis.

3. The adjustable anti-roll bar arrangement of claim 1, wherein:
   the bracket comprises a first side and a second side;
   the first side faces the second end of the stabilizer stay; and
   the roll stiffness is increased when the second end of the stabilizer stay is moved in a direction towards the bracket, and decreased when the second end of the stabilizer stay is moved in a direction away from the bracket.

4. The adjustable anti-roll bar arrangement of claim 1, wherein:
the stabilizer stay is a first stabilizer stay located at one end of the anti-roll bar;
the adjustable anti-roll bar arrangement further comprises another stabilizer stay located at the other end of the anti-roll bar; and
when the second end of the first stabilizer stay moves towards the another stabilizer stay the roll stiffness is decreased, and when the second end of the first stabilizer stay moves in a direction away from the another stabilizer stay the roll stiffness is increased.

5. The adjustable anti-roll bar arrangement of claim 1, wherein the linear actuator comprises an electric motor and a guide shaft defining the first geometrical axis, and the electric motor is configured to drive the guided element along the guide shaft.

6. The adjustable anti-roll bar arrangement of claim 5, wherein:
the guide shaft is a lead screw provided with male threads;
the guided element is provided with female threads engaging the male threads;
the electric motor is configured to rotate the lead screw; and
the guided element moves along the lead screw when the lead screw is rotated.

7. The adjustable anti-roll bar arrangement of claim 1, comprising a pivotable element which is pivotally mounted to the bracket via a pivot axle, wherein the supporting shaft is connected to the pivotable element such that when the pivotable element pivots about the pivot axle, the supporting shaft, the linear actuator and the guided element follows the pivoting motion of the pivotable element.

8. The adjustable anti-roll bar arrangement of claim 1, wherein:
the anti-roll bar has a left side and a right side;
the bracket, the linear actuator, the guided element, the supporting shaft and the stabilizing stay form a set provided on one of the left side and right side of the anti-roll bar; and
a corresponding set is provided mirror-symmetrically on the other one of the left side and right side of the anti-roll bar.

9. The adjustable anti-roll bar arrangement of claim 1, wherein:
the supporting shaft is a first supporting shaft,
the anti-roll bar is a first anti-roll bar, and
the stabilizer stay is a first stabilizer stay,
wherein the adjustable anti-roll bar arrangement is configured for a double-axle installation by further comprising:
a second anti-roll bar, and
a second stabilizer stay, and
a second supporting shaft mounted to the bracket and defining a third geometrical axis, wherein:
the second stabilizer stay has a first end connected to the second anti-roll bar, and a second end movably connected to and supported by the first supporting shaft or by the optional second supporting shaft, and
the second end of the second stabilizer stay is also connected to the guided element such that when the linear actuator drives the guided element along the first geometrical axis, the second end of the second stabilizer stay follows the motion along the second or third geometrical axis.

10. The adjustable anti-roll arrangement of claim 9, wherein:
the first, second and third geometric axes are located in a first, second and third geometric plane, respectively;
the first, second and third geometric planes extend in parallel with each other; and
the first geometric plane is located in between the second and third geometric planes.

11. The adjustable anti-roll bar arrangement of claim 1, comprising a controller configured to receive an input signal and based on the input signal send a control signal to the linear actuator to activate the linear actuator to move the guided element.

12. The adjustable anti-roll bar arrangement of claim 11, wherein in the input signal is one of:
a driver command signal representative of a driver request for change of roll stiffness of the vehicle, and
a sensor signal received from a sensor configured to detect vehicle operating parameters and/or road surface roughness variations.

13. A vehicle comprising an adjustable anti-roll bar arrangement for a vehicle, comprising:
a bracket configured to be mounted in a fixed relationship to a chassis or an axle of the vehicle,
a linear actuator connected to the bracket,
a guided element, the linear actuator configured to drive the guided element along a first geometrical axis,
a supporting shaft mounted to the bracket and defining a second geometrical axis, the second geometrical axis having a different extension compared to the first geometrical axis,
an anti-roll bar, and
a stabilizer stay having a first end connected to the anti-roll bar, and a second end movably connected to and supported by the supporting shaft,
the second end of the stabilizer stay is also connected to the guided element such that when the linear actuator drives the guided element along the first geometrical axis, the second end of the stabilizer stay follows the motion along the second geometrical axis.

14. The vehicle of claim 13, wherein the vehicle has a geometrical roll axis and a geometrical pitch axis transverse to the roll axis, and the first geometrical axis extends in parallel to the pitch axis.

15. The vehicle of claim 13, wherein movement of the second end of the stabilizer stay towards the centre of the vehicle decreases the roll stiffness of the vehicle, and movement of the second end of the stabilizer stay away from the centre of the vehicle increases the roll stiffness of the vehicle.

* * * * *